US012263935B2

(12) United States Patent
Schwing et al.

(10) Patent No.: US 12,263,935 B2
(45) Date of Patent: Apr. 1, 2025

(54) FLOOR SYSTEM FOR A CABIN OF A VEHICLE

(71) Applicant: Airbus Operations GmbH, Hamburg (DE)

(72) Inventors: Bernd Schwing, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/520,239

(22) Filed: Nov. 27, 2023

(65) Prior Publication Data
US 2024/0174342 A1 May 30, 2024

(30) Foreign Application Priority Data
Nov. 30, 2022 (EP) .................................... 22210552

(51) Int. Cl.
*B64C 1/18* (2006.01)
*B64D 11/06* (2006.01)
(52) U.S. Cl.
CPC ............ *B64C 1/18* (2013.01); *B64D 11/0696* (2013.01)
(58) Field of Classification Search
CPC .............................. B64C 1/18; B64D 11/0696
See application file for complete search history.

(56) References Cited
U.S. PATENT DOCUMENTS

| | | | |
|---|---|---|---|
| 4,479,621 A | 10/1984 | Bergholz | |
| 2014/0044914 A1 | 2/2014 | Kurtz et al. | |
| 2015/0108273 A1 | 4/2015 | Oleson | |
| 2015/0298423 A1* | 10/2015 | Holemans | F16B 5/01 428/116 |
| 2019/0077495 A1* | 3/2019 | Lange | B32B 3/30 |
| 2023/0271707 A1* | 8/2023 | Vandewall | H01R 33/88 244/118.6 |
| 2024/0174341 A1* | 5/2024 | Poppe | E04B 5/10 |

OTHER PUBLICATIONS

European Search Report for corresponding European Patent Application No. 22210552.0 dated May 15, 2023; priority document.

* cited by examiner

*Primary Examiner* — Rodney A Bonnette
(74) *Attorney, Agent, or Firm* — Greer, Burns & Crain, Ltd.

(57) ABSTRACT

A floor system for a cabin of a vehicle is proposed, the floor system including a floor panel having a bottom layer, a top layer and a continuous stiffening structure having an alternating arrangement of elongated first depressions and elongated protrusions arranged between the bottom layer and the top layer, an elongated cover component, and at least one seat rail component. The cover component has an upper surface, a lower surface, and an elongated second depression reaching from the upper surface to the lower surface and having a shape that corresponds to the shape of the first depressions. The cover component is configured to be mounted inside a first depression that is accessible through an elongated cutout extending along a depression of the stiffening structure. The at least one seat rail component is attachable to the cover component to provide a seat rail along the floor panel.

15 Claims, 3 Drawing Sheets

FLOOR SYSTEM FOR A CABIN OF A VEHICLE

CROSS-REFERENCES TO RELATED APPLICATIONS

This application claims the benefit of the European patent application No. 22210552.0 filed on Nov. 30, 2022, the entire disclosures of which are incorporated herein by way of reference.

FIELD OF THE INVENTION

The invention relates to a floor system for a cabin of a vehicle, a cabin of an aircraft as well, and aircraft having such a cabin and a method.

BACKGROUND OF THE INVENTION

In a cabin of vehicle, such as an aircraft, often rail systems and floor panels are installed. For example, it is common to attach passenger seats, cabin monuments and the like on seat rails, which extend parallel to a longitudinal axis of the aircraft, are arranged on or in a cabin floor and comprise suitable receptacles for receiving fittings. Seat rails are commonly attached to crossbeams of a vehicle structure and often carry floor panels that constitute the cabin floor. For this purpose, the floor panels are often connected to the seat rails, for example, via bolt connections at their edges. A seat rail often comprises a first chord, a second chord arranged at a vertical distance therefrom and a web running in between both chords. A direction of force between a floor panel bolted to a seat rail and the structure can thus be quite complex and not straight. In addition to the bolted connection, sealings are required at several points to prevent moisture stemming from the cabin to pass through to the seat rail.

SUMMARY OF THE INVENTION

It is an object of the invention to propose an alternative floor system having seat rails and floor panels, which are simple to manufacture, mount and seal and provide a simplified load path.

A floor system for a cabin of a vehicle is proposed, the floor system comprising a floor panel having a bottom layer, a top layer and a continuous stiffening structure having an alternating arrangement of elongated first depressions and elongated protrusions arranged between the bottom layer and the top layer, an elongated cover component, and at least one seat rail component, wherein the cover component has an upper surface, a lower surface, and an elongated second depression reaching from the upper surface to the lower surface and having a shape that corresponds to the shape of the first depressions, wherein the cover component is adapted to be mounted inside a first depression that is accessible through an elongated cutout extending along a depression of the stiffening structure, and wherein the at least one seat rail component is attachable to the cover component to provide a seat rail along the floor panel.

Here, a new approach for providing a floor in a cabin of the vehicle is provided. The floor panel used in the floor system according to the invention may differ from known floor panels. For example, it may be provided in the form of an endless panel that is cut to size. The floor panel has two cover layers in the form of the top layer and the bottom layer. The layers are arranged in a distance to each other and enclose the stiffening structure, which is bonded to both the top layer and the bottom layer. Instead of a common honeycomb structure, the stiffening structure has a series of elongated depressions and protrusions arranged one after another in an alternating manner. The first depressions and first protrusions preferably correspond to each other in their size and shape and may exemplarily be provided in different orientations, e.g., mirror-inverted or rotated about 180° about a main extension axis. For example, the stiffening structure continuously undulates between the bottom layer and the top layer, like a corrugated sheet or trapezoidal sheet. Hence, the top layer is arranged above an alternating series of first depressions and first protrusions.

For an integration of a seat rail or similar devices having receptacles for receiving fittings, a cutout may be provided in the top layer directly above one of the first depressions. Thus, the respective first depression is accessible from above the top layer. The cover component shaped to correspond to the first depressions, may then be placed into the uncovered first depression. It is preferably designed to overlap edge regions of the cutout. Resultantly, the cover component covers the respective first depression to avoid the ingress of humidity from above the top layer into its interior. However, due to the corresponding shape, the cover component provides an accessible depression as well, which is referred to as second depression. The cover component constitutes the base for an integration of the at least one seat rail component.

The at least one seat rail component is attachable to the cover component to provide a plurality of receptacles for receiving fittings. It is conceivable to use different types of seat rail components as desired. With the floor system according to the invention, a separation of floor panels and seat rails is not required. The floor panel may be directly attached to the structure of the vehicle and the at least one seat rail component is directly attached to the floor panel. Furthermore, it is conceivable that the cover component and the floor panel are connected through fasteners that reach through both the cover component and the floor panel into the structure, such as a crossbeam. Consequently, the floor system allows a very flexible creation of a floor with integrated receptacles for receiving fittings, a simple attachment, and an improved load transfer into the structure.

In an advantageous embodiment, the cover component comprises two flanges laterally extending away from the second depression at the upper surface, such that the flanges rest on the top layer adjacent to the cutout, when the second depression is mounted inside the respective first depression. The cover component thus overlaps the top layer and provides an improved sealing of the interior of the floor panel. It is conceivable to provide a sealing component between the top layer and the cover component. The sealing component may be made from an elastomer component or it may comprise a hardening or non-hardening paste-like sealing material. However, it may also be conceivable to provide a fluid-tight connection between the cover component and the top layer, such as through material bonding.

In an advantageous embodiment, the stiffening structure comprises a corrugated or trapezoidal sheet. The sheet may be made from a metallic or plastic material. The sheet may be an endless sheet, which is continuously corrugated or bent to provide the desired structure.

In an advantageous embodiment, the first depressions comprise a first base arranged on the bottom layer, wherein the cover component has a second base arrangeable on the first base, and wherein the second base is attachable to the first base. The stiffening structure thus has a plurality of first bases, which are considered bottom sections of the stiffening structure that are in direct contact with an inner surface of the bottom layer and that also provide a resting surface for the cover component opposite the bottom layer. The shape of the resting surface depends on the chosen profile of the stiffening structure and may exemplarily have a trough shape.

In an exemplary embodiment, the at least one seat rail component is an elongated flat element attachable to the flanges. Thus, the at least one seat rail component extends over the respective first depression as well as the cover component. Exemplarily, it may comprise several openings, into which fittings can be inserted. A part of the fittings protrudes into an intermediate space underneath the respective seat rail component above the cover component. The fittings may be clampable into the openings and fixable to objects to attach the objects to the respective seat rail component.

In an advantageous embodiment, the cover component and the at least one seat rail component comprise a weldable material, such that the at least one seat rail component is weldable to the flanges. For example, the cover component and the at least one seat rail component may be made from a thermoplastic material, such as polyetherketoneketone (PEKK), polyetheretherketone (PEEK), polyetherimide, polycarbonate, polypropylene, and others. This allows a simple welding of these components to provide a sturdy and fluid-tight attachment.

In an advantageous embodiment, the at least one seat rail component comprises a plurality of crossmembers fixedly attachable in the second depression. The crossmembers may each be attached to the cover component in a direction perpendicular to the main extension direction of the first depressions and first protrusions. Fittings may clamp with the crossmembers to provide a tight connection for an object resting on the floor panel.

In an advantageous embodiment, the at least one seat rail component comprises a plurality of spherical indentations distributed along the cover component for receiving spherical fittings. The spherical indentations may be used for receiving spherical, expandable fasteners to fasten objects to the at least one seat rail component, wherein the spherical fasteners would be able to assume an adjustable angle in the at least one seat rail component.

In an advantageous embodiment, the floor system further comprises a plurality of floor panels, wherein the floor panels each comprise an interface edge having at least one first form-fitting element and at least one second form-fitting element, and wherein the floor panels are adapted to connect to each other through the first form-fitting elements and the second form-fitting elements at the interface edges. Several floor panels may thus be joined to form an enlarged floor surface. It is preferred that the interface edges are arranged in a predetermined cutout-region, where a first depression will be used for receiving a cover component and at least one seat rail component. For example, the engaging interface edges may at least partially overlap. Also, the interface edges may alternately protrude into a connection area one after the other and may alternately be connected to the structure.

In an advantageous embodiment, the at least one floor panel comprises a thermoplastic material. This may relate to at least the stiffening structure. However, also the top and bottom layer may comprise such a material. It is conceivable that the thermoplastic material also comprises reinforcement fibers, such as glass fibers, carbon fibers or aramid fibers.

The invention further relates to a cabin of an aircraft, having a floor comprising a floor system according to the above, wherein at least one object is arranged on the floor and attached to the at least one seat rail component. It is to be understood that a plurality of elongated cutouts, elongated cover components and seat rail components may be arranged in the cabin, wherein the elongated cutouts and cover components are preferably aligned so as to be parallel to a longitudinal axis of the aircraft.

The invention also relates to an aircraft, comprising an aircraft structure and a cabin according to the above arranged therein.

The invention further relates to a method for creating a floor in a cabin of a vehicle using a floor system according to the above, comprising the steps of providing a cutout in the top layer of a floor panel extending along a first depression of the stiffening structure, mounting at least one elongated cover component inside the first depression, and attaching at least one seat rail component to the cover component.

In an advantageous embodiment, the method further comprises providing at least one further floor panel, and placing interface edges of two floor panels of at least one pair of floor panels onto each other, such that at least one first form-fitting element of one of the floor panels and at least one second form-fitting element of the other one of the floor panels of the respective pair interlock.

In an advantageous embodiment, at least one of the at least one elongated cover component is arranged above both interface edges.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
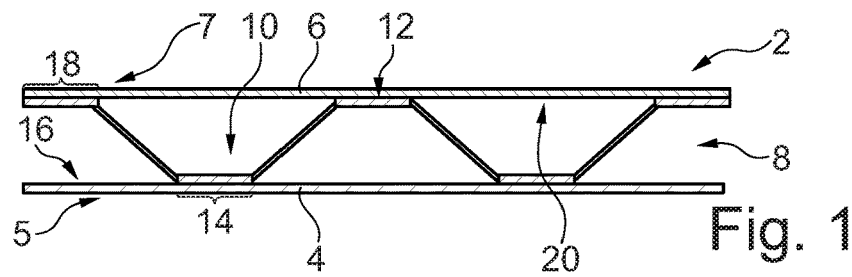
FIG. 1 shows a floor panel in a sectional view.

FIG. 1 shows a floor panel 2 for creating a floor in a cabin of a vehicle. Here, the floor panel 2 comprises a bottom layer 4 with a lower surface 5, a top layer 6 with an upper surface 7 and a continuous stiffening structure 8 enclosed between the bottom layer 4 and the top layer 6. The stiffening structure 8 has an alternating arrangement of elongated first depressions 10 and elongated protrusions 12. Here, the stiffening structure 8 is shown in a sectional view and its cross-sectional profile is chosen to be trapezoidal. Other profiles are conceivable, such as a corrugated profile or other.

Each of the first depressions 10 comprises a first base 14, which may be considered a lowermost part of the respective first depression 10. The first bases 14 are in contact with an inner surface 16 of the bottom layer 4. For example, it is bonded to the bottom layer 4.

The stiffening structure 8 has a symmetrical shape and thus comprises upper parts 18, which are complementary to the first bases 14 and which are in direct contact with an inner surface 20 of the top layer 6. Exemplarily, the stiffening structure 8 is made from a fiber-reinforced plastic material, e.g., having a thermoplastic or a thermoset matrix material. However, it is also conceivable to use a metallic material.

The floor panel 2 may be designed in the form of an endless floor panel, which is cut to size before installation. However, distinctly dimensioned floor panels 2 are also conceivable.

Figure 2:
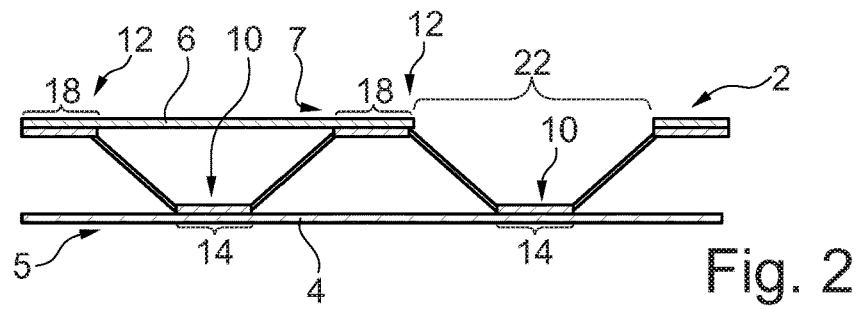
FIG. 2 shows the floor panel with a cutout.

FIG. 2 shows a cutout 22, which exemplarily extends along one of the first depressions 10 and is thus an elongated cutout 22. Here, the respective depression 10 is open to the exterior of the floor panel 2.

Figure 3:
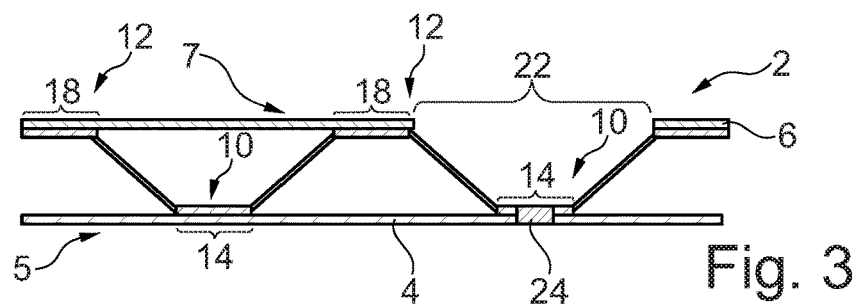
FIG. 3 shows the floor panel with the cutout and an attachment in the bottom layer.

After providing the cutout 22, as shown in FIG. 3, an attachment hole 24 is provided, which reaches through the base 14 of the open first depression 10 as well as the bottom layer 4. This allows mounting of the floor pendant to a structure of the respective vehicle.

Figure 4:
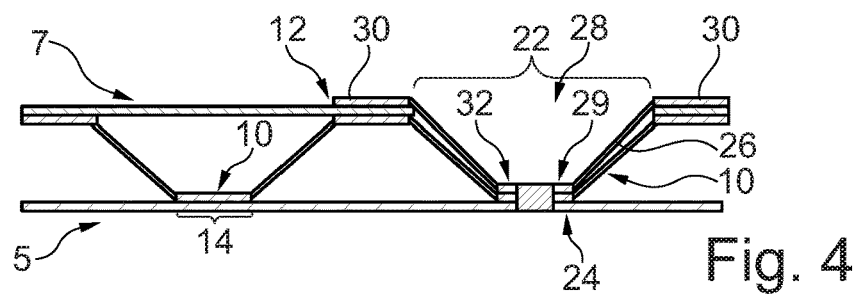
FIG. 4 shows a cover component arranged inside a depression underneath the cutout.

FIG. 4 shows a cover component 26 arranged inside the open first depression 10 and comprising a second depression 28. The cover component 26 has a trough-shape that corresponds to the shape of the first depression 10, as well as a second base 29, which is arrangeable on the first base 14. Also, two lateral flanges 30 are provided, which rest on the top layer 6 adjacent the elongated cutout 22. It is conceivable that the cover component 26 is made from the same material as the stiffening structure 8 and/or the top layer 6, such that it may be welded onto the top layer 6.

However, for providing a sturdy base for the installation of objects, the cover component 26 may also comprise a different material, such as a metal, e.g., titanium. The cover component 26 may be glued to the top layer 6 or it may simply rest on it, preferably under enclosing a hardening or non-hardening paste-like sealing material. For mechanically fastening the cover component 26, it exemplarily comprises a through-hole 32 that matches with the attachment hole 24.

Figure 5:
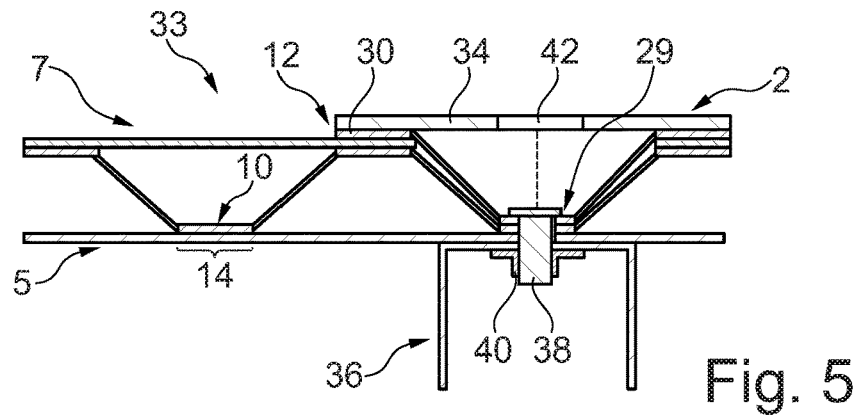
FIG. 5 shows a flat seat rail component on the cover component.

FIG. 5 shows a floor system 33 with the previously shown components as well as an elongated, flat seat rail component 34, that rests on the lateral flanges 30. The seat rail component 34 may be glued, welded, or otherwise bonded to the lateral flanges 30.

In this illustration, a crossbeam 36 of the vehicle structure is shown, into which a floor is created. The floor panel 2 is directly attached to the crossbeam 36 through fasteners 38, which are exemplarily shown as bolts that are capable of engaging nuts 40 for clamping the floor panel 2 to the crossbeam 36. Thus, the floor panel 2, as well as the cover component 26, together with the seat rail component 34, are both directly connected to the structure 36. This leads to an optimized, direct load transfer into the structure 36.

In this example, the seat rail component 34 comprises a plurality of receptacle holes 42 for receiving fittings connected to objects that are to be placed and held on the floor. The receptacle holes 42 comprise a certain contour, which may correspond to those of a common seat rail. The receptacle holes 42 are preferably arranged in a common spacing and comprise a distance of 1 inch (2.54 cm) or the like. It is conceivable to use a standard hole pattern such as in a Douglas seat rail or the like. The seat rail component 34 may also comprise a slit extending through the receptacle holes 42.

Figure 6:
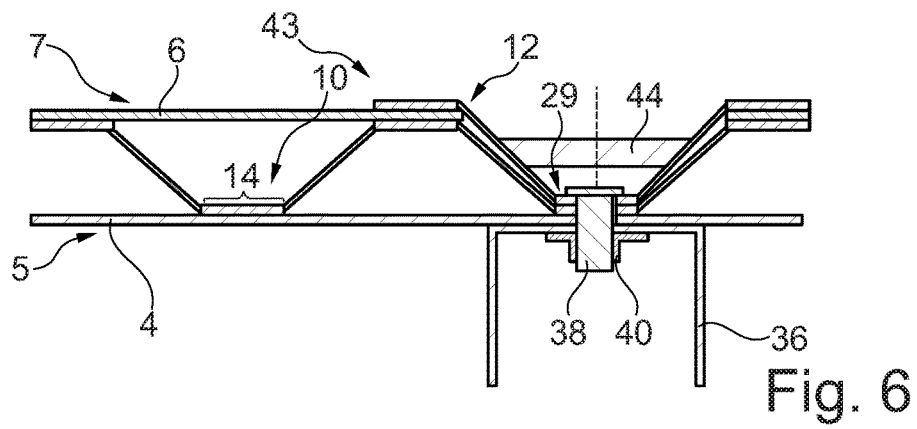
FIG. 6 shows a crossmember as seat rail component.

FIG. 6 shows a different embodiment of a floor system 43. Here, instead of a flat part on top of the flanges 30, a plurality of transversely arranged crossmembers 44 are provided, which are fixed to the cover component 26. The crossmembers 44 are preferably distributed in an equidistant manner. The spacing of the crossmember 44 may correspond to the spacing of holes in common seat rails. For example, the distance may also be 1 inch (2.54 cm) or more. Fittings may be advanced from above to reach under the respective crossmember 44 and hook into it provide a connection.

Figure 7:
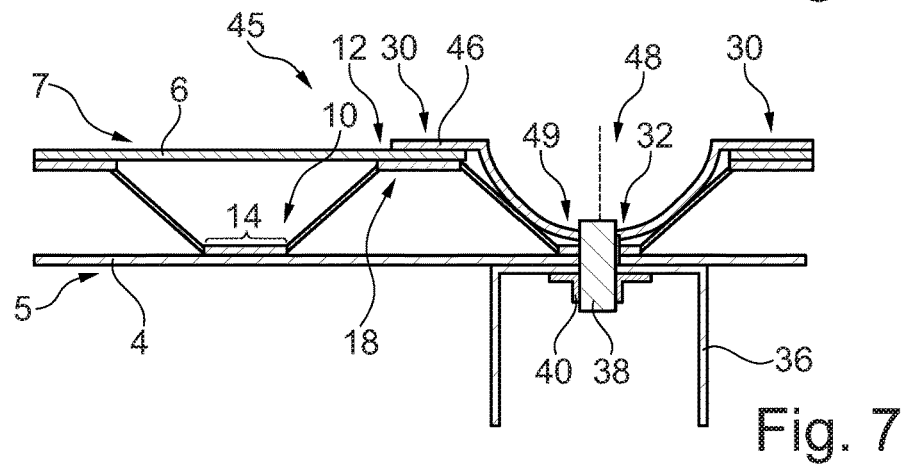
FIG. 7 shows a seat rail component having spherical indentations.

FIG. 7 shows a floor system 45 that comprises a cover component 46 having a plurality of spherical indentations 48 distributed along the cover component 46. The spherical indentations 48 are capable of receiving correspondingly shaped spherical fittings. These are insertable into the indentations 48 and may be expandable to firmly clamp the fitting inside the respective indentation 48. The spherical indentations 48 exemplarily comprise a second base 49, which is arrangeable on the first base 14 and which comprise a through-hole 32 for feeding-through a fastener 38.

Figure 8:
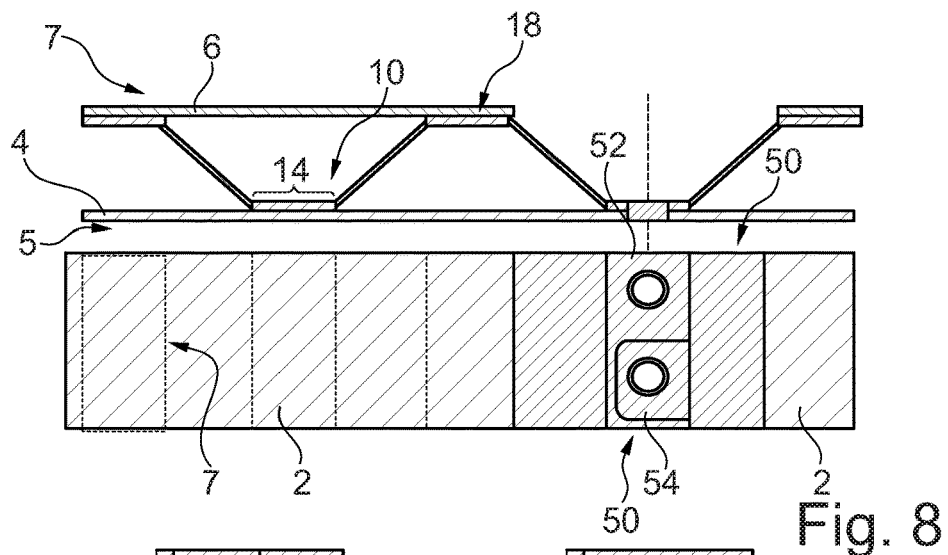
FIG. 8 shows two joined floor panels at interface edges.

In case the floor panel 2 is not sufficient in size for creating a floor inside the vehicle, a plurality of floor panels 2 may be arranged adjacent to each other and be connected to each other. For this purpose, two or more floor panels 2 can be provided, which each comprise an interface edge 50, as shown in FIG. 8. The interface edges 50 are designed in a way that two interface edges 50 can interlock for providing the connection. In the example shown in FIG. 8, the interface edges 50 have a lateral protrusion as a first form-fitting element 52 and a lateral cutout as a second form-fitting element 54, which are complementary to each other. With two interface edges 50 overlapping, they interlock to create a form-fitting engagement that is capable of transferring forces parallel to their main extension planes. By arranging the floor panels 2 and the cover component 26 in a way that the cover component 26 rests on both interface edges 50, the interlock is secured and the floor panels 2 are fastened to transfer loads in a direction perpendicular to the main extension planes. It is thus preferred that the attachment holes 24 are arranged directly in the interface edges 50.

Figures 9A, 9B:
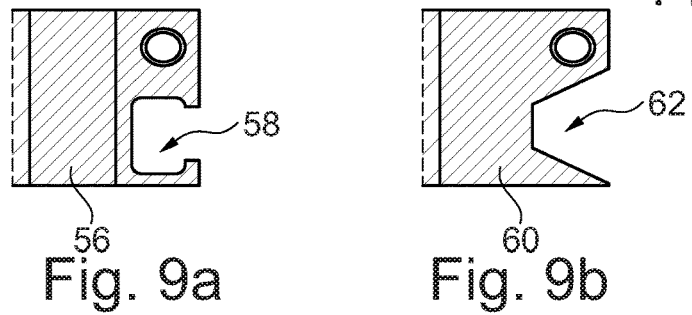
FIGS. 9a and 9b show two examples of interface edges.

Since the illustration in FIG. 8 is only an example, FIGS. 9a and 9b show further examples of interface edges 56 and 60 with differently designed cutouts as first form-fitting elements 58 and 62. The complementary protrusions as second form-fitting elements are not shown in detail, but will be apparent for the skilled person.

Figure 10A:
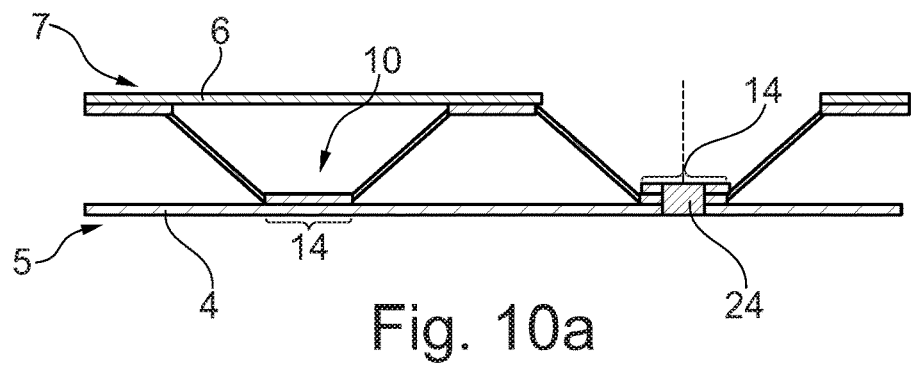
FIG. 10a shows overlapping stiffening structures of floor panels.
Figure 10B:
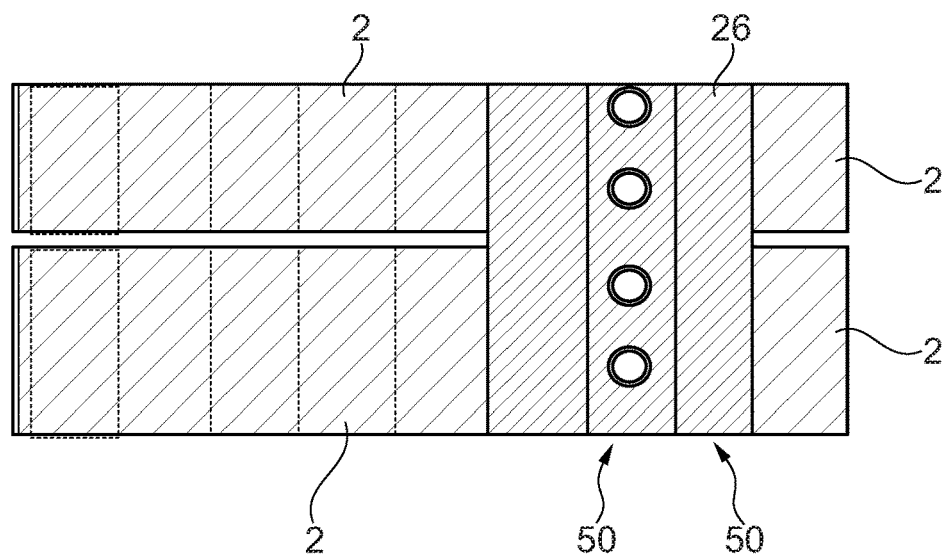
FIG. 10b shows an overlapping cover component to join floor panels.

Also, as shown in FIGS. 10a and 10b, two overlapping bases 14 of two adjacent floor panels 2 are provided for a connection. FIG. 10b shows two adjacent floor panels 2, which are placed underneath an elongated cover element 26, which leads to fastening the two floor panels 2 relative to each other.

Figure 11:
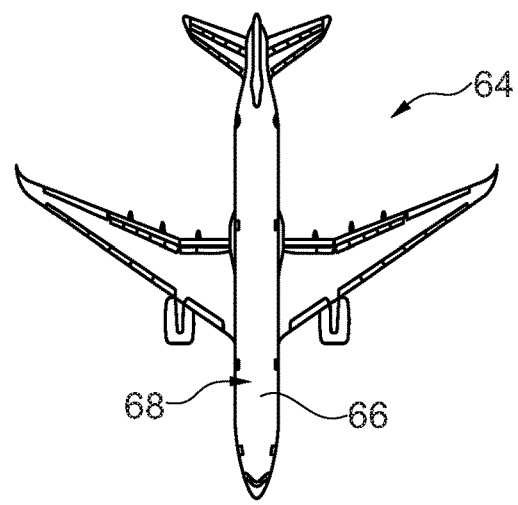
FIG. 11 shows an aircraft.

FIG. 11 shows an aircraft 64 having a fuselage 66 and a cabin 68 created therein. The cabin 68 comprises a floor, which is made by a floor system 33, 43 or 45 according to FIG. 5, 6 or 7 or any modification thereof.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 floor panel
4 bottom layer
5 lower surface
6 top layer
7 upper surface
8 stiffening structure
10 first depression
12 protrusion
14 first base
16 inner surface
18 upper part
20 inner surface
22 cutout
24 attachment hole
26 cover component
28 second depression
29 second base
30 lateral flange
32 through-hole
33 floor system
34 flat seat rail component
36 crossbeam
38 fastener
40 nut
42 receptacle hole
43 floor system
44 crossmember
45 floor system
46 cover component
48 indentation
49 second base
50 interface edge
52 first form-fitting element
54 second form-fitting element
56 interface edge
58 first form-fitting element
60 interface edge
62 first form-fitting element
64 aircraft
66 fuselage
68 cabin

The invention claimed is:

1. A floor system for a cabin of a vehicle, comprising:
At least one floor panel having a bottom layer, a top layer and a continuous stiffening structure having an alternating arrangement of elongated first depressions and elongated protrusions arranged between the bottom layer and the top layer,
an elongated cover component, and
at least one seat rail component,
wherein the cover component has
an upper surface,
a lower surface, and
an elongated second depression reaching from the upper surface to the lower surface and having a shape that corresponds to the shape of the first depressions,
wherein the cover component is configured to be mounted inside a first depression that is accessible through an elongated cutout extending along a first depression of the stiffening structure, and
wherein the at least one seat rail component is attachable to the cover component to provide a seat rail along the floor panel.

2. The floor system according to claim 1, wherein the cover component comprises two lateral flanges laterally extending away from the second depression at the upper surface, such that the flanges rest on the top layer adjacent to the cutout, when the second depression is mounted inside the respective first depression.

3. The floor system of claim 2, wherein the at least one seat rail component is an elongated flat element attachable to the flanges.

4. The floor system of claim 3, wherein the cover component and the at least one seat rail component comprise a weldable material, such that the at least one seat rail component is weldable to the flanges.

5. The floor system according to claim 1, wherein the stiffening structure comprises a corrugated or trapezoidal sheet.

6. The floor system according to claim 1,
wherein the first depressions comprise a first base arranged on the bottom layer,
wherein the cover component has a second base arrangeable on the first base, and
wherein the second base is attachable to the first base.

7. The floor system of claim 1, wherein the at least one seat rail component comprises a plurality of crossmembers fixedly attachable in the second depression.

8. The floor system of claim 1, wherein the at least one seat rail component comprises a plurality of spherical indentations distributed along the cover component for receiving spherical fittings.

9. The floor system of claim 1, wherein the at least one floor panel comprises a plurality of floor panels,
wherein the floor panels each comprise an interface edge having at least one first form-fitting element and at least one second form-fitting element, and
wherein the floor panels are adapted to connect to each other through the first form-fitting elements and the second form-fitting elements at the interface edges.

10. The floor system of claim 1, wherein the at least one floor panel comprises a thermoplastic material.

11. A cabin of an aircraft, having a floor created by a floor system of claim 1, wherein at least one object is arranged on the floor and attached to the at least one seat rail component.

12. An aircraft, comprising an aircraft structure and the cabin of claim 11 arranged therein.

13. A method for creating a floor in a cabin of a vehicle using a floor system according to claim 1, comprising the steps:
providing a cutout in the top layer of a floor panel extending along a first depression of the stiffening structure,
mounting at least one elongated cover component inside the first depression, and
attaching at least one seat rail component to the cover component.

14. The method according to claim 13, further comprising:

providing at least one further floor panel, and placing interface edges of two floor panels of at least one pair of floor panels onto each other, such that at least one first form-fitting element of one of the floor panels and at least one second form-fitting element of the other one of the floor panels of the respective pair interlock.

15. The method according to claim 14, wherein at least one of the at least one elongated cover component is arranged above both interface edges.

* * * * *